June 20, 1933.    W. R. GREEN    1,914,419
HEDGE TRIMMER
Filed April 9, 1931    2 Sheets-Sheet 2
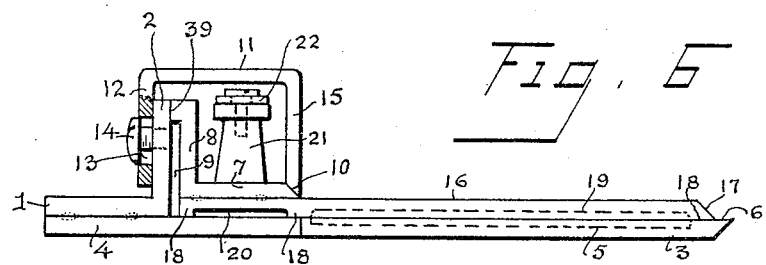
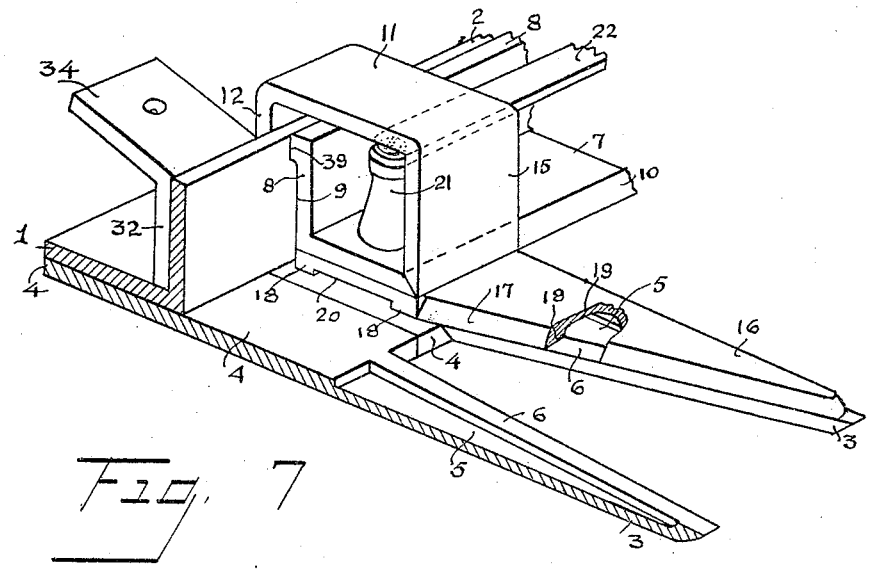
Wyman R. Green  *Inventor*
By  N. S. Amstutz  *Attorney*

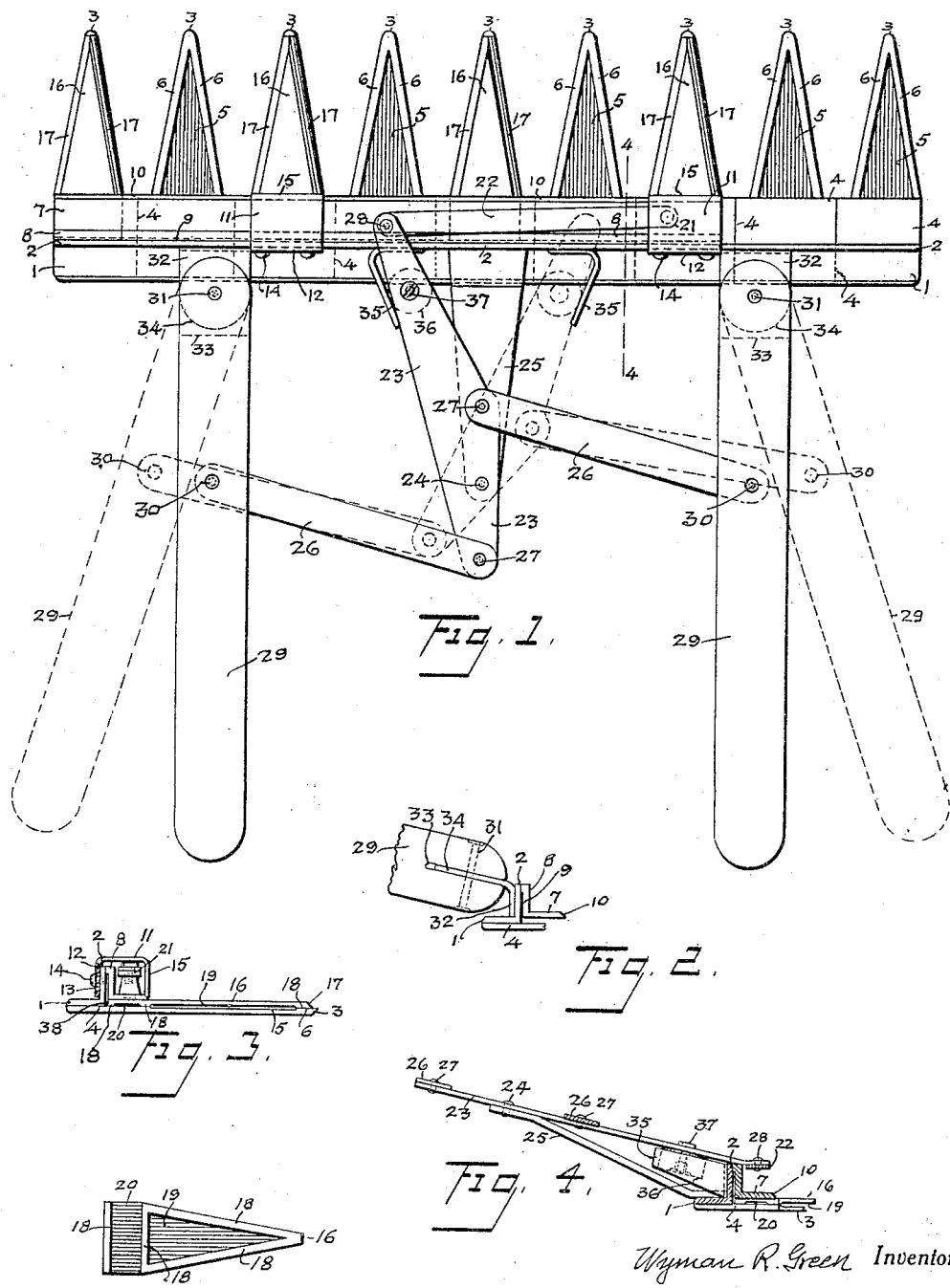

Patented June 20, 1933

1,914,419

UNITED STATES PATENT OFFICE

WYMAN R. GREEN, OF CHATTANOOGA, TENNESSEE

HEDGE TRIMMER

Application filed April 9, 1931. Serial No. 528,875.

My invention relates to improvements in hedge trimmers, and it more especially consists of the features pointed out in the annexed claims.

The purpose of my invention is to provide a hedge trimmer that is light, and free from difficulty of operation through the accumulation of gums etc., from the cuttings; that provides a plurality of fingers on a supporting bar over which bar a second bar slides said second bar carrying a plurality of cutting knives of less number than the fingers; that utilizes an angular shaped bar for the fingers and a similar angular shaped bar for the cutting knives; that uses retaining plates for the cutting bar which are secured to the finger supporting bar; that combines a pressure of the retaining plates in two directions against the cutting bar; that may employ spot welding for securing the fingers to the supporting bar and the cutting blades to the cutting bar; and that combines cooperating elastic elements to cushion the stroke of the cutting bar at its extremes of movement.

With these and other ends in view, I illustrate in the accompanying drawings such instances of adaptation as will disclose the broad underlying features of my invention without limiting myself to the specific details shown thereon or described herein.

Figure 1 is a top plan view of an assembled trimmer.

Fig. 2 is a fragmentary side elevation of the handle attachment to the supporting bar.

Fig. 3 is an end elevation of Fig. 1 without the handle operating mechanism.

Fig. 4 is an end elevation in section on line 4—4 of Fig. 1.

Fig. 5 is a bottom view of one of the cutting blades.

Fig. 6 is an enlarged view of Fig. 3, partly in section.

Fig. 7 is an enlarged perspective view partly in section of the right hand end of Fig. 1.

In the use of my invention, I may employ whatever alternatives or equivalents of construction that the exigencies of varying conditions may require without departing from the broad spirit of the invention.

The present invention is related to that set forth in my application Serial Number 484,593, filed September 26, 1930.

The main angle support for the fingers has a base portion 1 and a vertical portion 2, the attaching portion 4 of the fingers 3 is spot welded or otherwise attached to the base portion 1. The length of the foot or attaching portion 4 is such that it serves to automatically space the fingers which occur between the fingers at the extreme ends of the finger supporting angle. Each one of the fingers 3 has a flat narrow margin 6 that bounds the recessed portion 5 on two sides, as shown in Fig. 1. A handle supporting bracket 32 is attached to the vertical portion 2 of the finger bar. This may be attached by spot welding or otherwise. It has an angular projection 34 that enters a slot 33 formed in one end of the handles 29. The portion 34 is pivoted in the handle on a pin or rivet 31.

The cutter bar to which the knives 16 are attached by spot welding or otherwise comprises a base portion 7 and a vertical portion 8. On the vertical portion 8 adjacent the vertical portion 2 of the finger bar, a recess 9 beneath a narrow projection 39 which extends the full length of the stroke of the bar 8 is formed so as to reduce the friction to a minimum. The front edge of the portion 7 is beveled throughout its length at 10; the purpose of which is to receive the beveled lower portion 15 of the clamping tension member 12. These tension members have the beveled vertical portion 15 joined to the vertical portion 12 by a horizontal portion 11.

The vertical portion 12 may be provided with slots 13 through which holding screws 14 pass. The purpose of the slots 13 is to provide means for changing the tension of the member 15 on the bevel 10, which by reason of the beveled faces serves to exert pressure in two directions at the same time, to hold the cutter bar in sliding engagement at 39 (Fig. 6) with the finger bar horizontally and at the same time hold the flat edges 18 of the knives 16 in close contact with the flat portion 6 of the fingers 3. There are two of these tension members positioned approximately as shown in Fig. 1.

The knives 16 have flat faces 18 which surround a recessed portion 19. A separate recessed portion 20 is bounded on two sides by the flat faces 18, see Fig. 5. Each knife has a beveled edge 17 to form a sharpened cutting edge. The fingers 3 may be similarly beveled so as to have their flat faces 6 serve the same purpose.

The cutter bar is moved sideways by means of a link 22, whose one end is attached to a post 21 that is secured to the horizontal portion 7 of the cutting bar in any desired manner by riveting, spot welding, or otherwise. The link 22 at 28 is attached to the operating lever 23. A support 25 for the lever 23 is attached to the upper face of the horizontal portion 1 of the finger bar. It projects rearwardly as shown in Fig. 4 and at 24 is pivoted to the lever 23. Links 26 are attached to the lever 23 at 27 and these links are pivoted to the handles 29 at 30.

Spring bumpers 35 are attached by spot welding or otherwise to the vertical portion 2 of the finger bar. These limit the movement of the cutting bar as one is positioned at each end of the movement of the lever 23. To reduce noise a rubber block 36 may be secured to the underside of the lever 23 by a screw 37 or otherwise.

It is specially pointed out that in contrast to the usual practice of providing as many knives as there are fingers, I use a plurality of fingers and a plurality of knives less in number than the fingers. I do not however limit myself to the ratio of knives to the fingers shown in Fig. 1 because other ratios may be employed so long as there are a plurality of knives fewer in number than the fingers. The ratios may be $x: 2x+1$, $x: 3x+1$, $x: 4x+1$, etc., etc.

The inner edges 38 of the blades or knives 16 do not engage the base 1 of the finger bar angle and thus they cooperate with the lengthwise recess 9 of the cutter bar which extends down to the base 4 of the cutting fingers. In view of the sticky exudate from the trimmed twigs it is of the utmost importance to reduce the friction of sliding parts, hence the deep recess of clearance 9 extending the entire length of the bar 8 between it and the bar 2. This clearance and the recesses 20 are formed to prevent the sticky substance making the device inoperative. It is this reduction of friction, by reason of the narrow ledge 39 formed at the upper edge of the bar 8 or any equivalent, that puts my device into the class of practical hedge trimmers. Whatever expedient may be used the essential structural requirements are that the major portion of the adjacent faces of the bar 8 and the bar 2 be spaced apart and kept out of actual engagement with each other. Whether the means for holding them separated, so as to form an open space or recess 9, be on one bar or the other, is immaterial. If on the bar 2 it need not extend the full length of the stroke of the bar 8, but may only have a restricted contact with the cutter bar, or the means for maintaining the separation referred to may be placed on the underside of the tension member 12 above the bar 2 as illustrated in Figs. 2 and 9 of my copending application Serial Number 547,669.

The blades and fingers may be shaped alike both having narrow engaging faces with a recess therebetween. Their hollowed faces when the blades and fingers are opposite each other form a considerable clearance space which I have found to be the only practical way of overcoming stickiness during operation. The number of lower blades or fingers will, according to the showing on Fig. 1, be double the number of upper blades plus one; or as an alternative, three times the upper blades plus one; or four times plus one, etc., it being important to have more than a single upper cutting blade as has been proposed heretofore.

What I claim is:

1. In hedge trimmers, a plurality of cutting fingers, a plurality of cutting knives of less number than the fingers, a slidable knife bar, a separate bar for supporting the knife bar, means constituting a combined tension and retaining member secured to the finger bar and engaging the cutter bar for simultaneously and adjustably holding the latter against displacement in a horizontal and vertical direction, a pair of handles separately pivoted to the finger bar, a lever pivotally supported by the finger bar, a connection therefrom to the cutter bar, links connecting the lever from opposite sides of its pivot to the handles, a cushioning stop member secured to the under side of the lever, and a pair of resilient limit stops secured to the finger bar and positioned at both extremes of the lever movement.

2. In hedge trimmers, an angle bar having vertical and horizontal legs, a lateral projection on the vertical leg of said bar at its upper edge adapted to reduce the bearing area of said leg, a beveled edge formed on the horizontal leg, a plurality of knives secured to the under side of the horizontal leg, a separate stationary angle bar adapted to support the cutter bar in a slidable relation, a plurality of cutting fingers secured to the under side of the last bar said fingers and said knives engaging each other as the bars are displaced laterally in respect of each other, means secured to the finger bar said means terminating in a beveled face adapted to engage the bevel edge of the cutter bar, and manual means for moving the knives to and fro across the fingers.

3. In hedge trimmers, a slidable cutter bar comprising vertical and horizontal portions of approximately the same dimensions throughout its length the vertical portion having a projection at its upper edge and the horizontal portion having a beveled edge, a plurality of cutting blades secured to the underside of said bar, a plurality of cutting fingers positioned beneath and in operative contact with the blades, an angle bar similar to the cutter bar to which the cutting fingers are attached, means for holding the two bars and the fingers and the blades in slidable relation with respect to each other such means serving to hold the vertical parts of the respective bars in spaced apart relation to each other, a pair of handles pivoted to the finger bar, and connecting means from the handles to the cutter bar whereby both handles are moved from each other simultaneously to approximately the same extent during the reciprocation of the cutter bar.

In testimony whereof I affix my signature.

WYMAN R. GREEN.